Oct. 22, 1963    R. HALLER ETAL    3,107,561
VERTICAL TURNING MILL

Filed Dec. 7, 1961    4 Sheets-Sheet 1

Inventor:

Oct. 22, 1963  R. HALLER ETAL  3,107,561
VERTICAL TURNING MILL

Filed Dec. 7, 1961  4 Sheets-Sheet 3

Inventor:

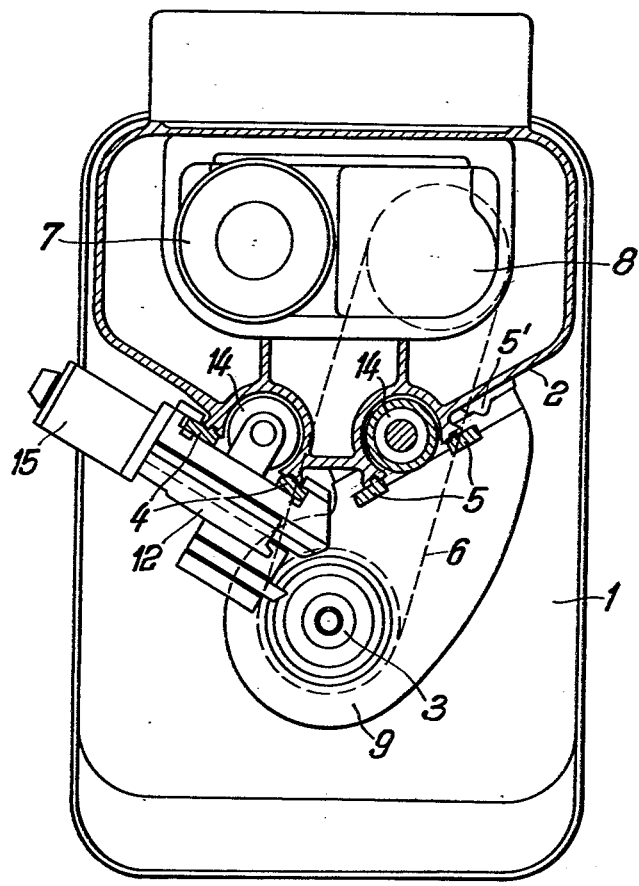

3,107,561
VERTICAL TURNING MILL
Reinhold Haller, Offenburg, Baden, and Lothar Scheffner, Bohlsbach, Germany, assignors to Wilhelm Kauffmann, Offenburg, Baden, Germany
Filed Dec. 7, 1961, Ser. No. 157,701
2 Claims. (Cl. 82—2)

This invention relates to a vertical turning mill having a main spindle drive situated at the bottom, a bed projecting vertically upwards from a base plate, and two guide paths disposed on the bed on each side of the turning axis of the machine and serving particularly for guiding tool rests.

Hitherto known vertical turning mills having a main spindle drive situated at the bottom and two guide tracks running along the bed have above all the disadvantage that suitable removal of chips is not possible and that the saving in space achieved by the upright position of the bed also does not comply with expectations. The inadequate removal of chips is above all due to the fact that the chip space intended to receive the chips resulting from the machining must be situated unfavourably distant towards the outside because of the main spindle drive located at the bottom end of the bed. If the volume of the chip space is still to be sufficient, it must extend to a great distance in front and on both sides of the spindle drive, because of the bed extending transversely over the entire width of the machine.

The present invention aims at improving the abovedescribed vertical turning machine in such a manner that the chips produced by the machining can flow off freely while only the smallest possible space is required for the chip space, although the latter is of adequate size.

According to the invention this aim is essentially achieved by disposing the main drive unit of the machine vertically in the bed behind the guide tracks, while the headstock, which is disposed at the lower part of one of the guide tracks, serves merely as a bearing for the main spindle which is driven through a belt.

Through the arrangement of the driving unit in the bed of the machine itself, namely behind the guide tracks, there is available at the front, beneath the workpiece to be machined, a space which in width practically does not exceed the width of the remainder of the machine but is nevertheless sufficiently large, and which encloses the centre headstock in a semi-circle, and the entire depth of which can be used as a chip space.

According to a preferred embodiment of the invention, the planes of the guide tracks run from the transverse plane of the bed which contains the rotational axis of the machine obliquely with an inclination in each case towards the rear side of the bed, while each of them forms with that plane an angle of about 30°. This results not only in a corresponding reduction of the width of the machine, but also at the same time a greater depth (in the direction of the rear side of the machine) of the chip space, which approximately compensates for the smaller total width, so that the further reduction of the machine width is made possible without loss of chip space.

The invention is illustrated by way of example in the accompanying drawings, in which.

The vertical turning mill illustrated consists essentially of a base plate 1, a vertical machine bed 2, and a main spindle 3 disposed on the base plate 1 and projecting upwards.

Figure 2:
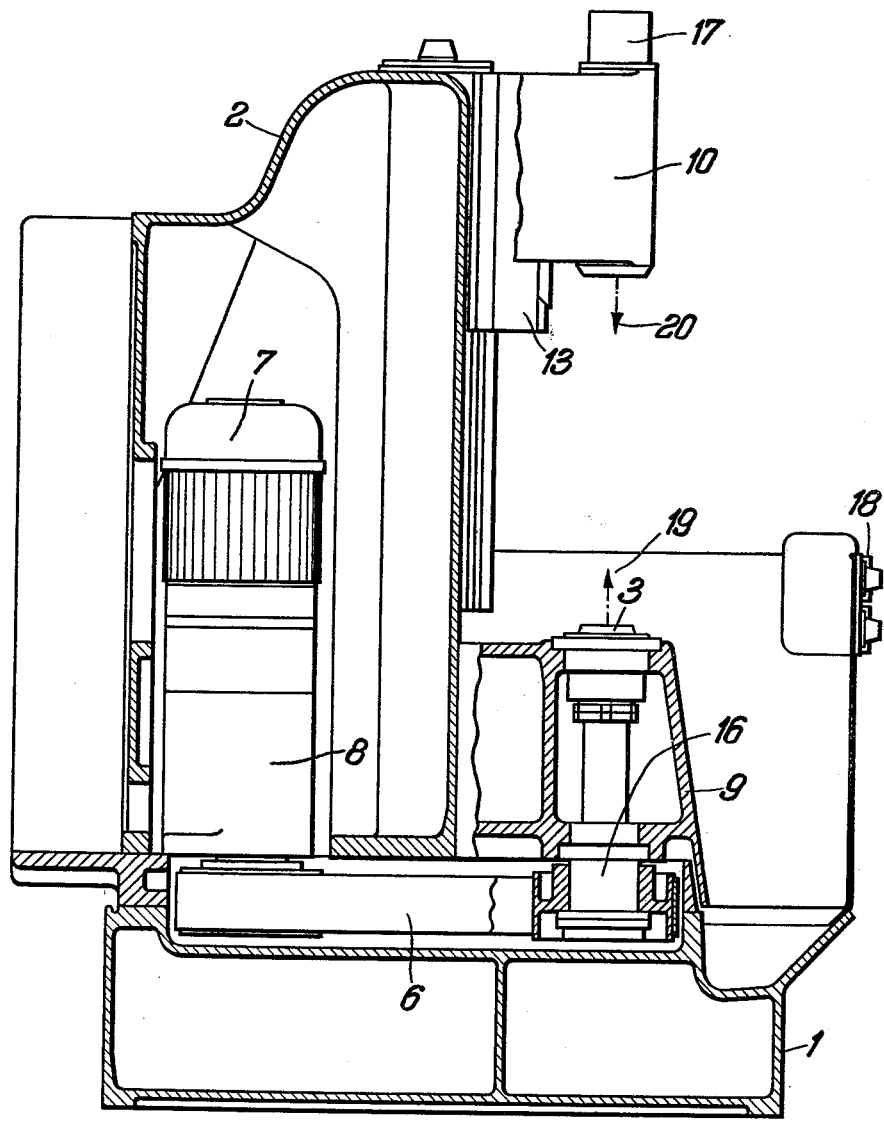
FIGURE 2 shows the same machine in a longitudinal section on the line II—II in FIGURE 1.
Figure 3:
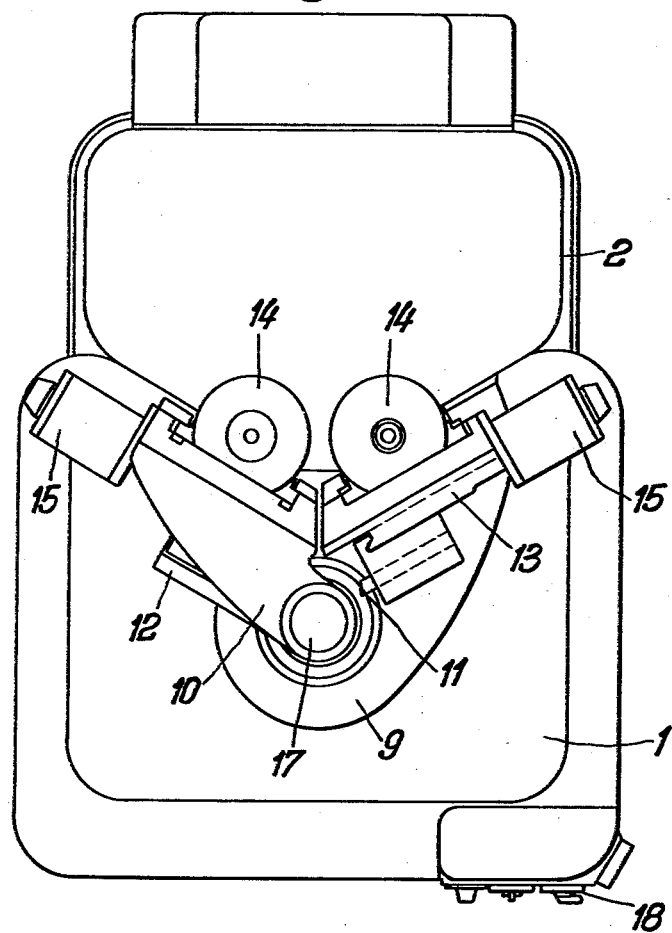
FIGURE 3 shows the same machine in a view from above, and FIGURE 4 the same machine in a cross-section on the line IV—IV in FIGURE 1.

As can be seen particularly from FIGURE 4, the machine bed 2 has two guide tracks 4 and 5, each consisting of two rails and the planes of which run from the transverse plane of the bed 2 which contains the axis of the main spindle 3 obliquely with an inclination in each case towards the rear side of the bed, while each of them forms with the said plane an angle of about 30°. The main spindle 3 can be driven through a belt drive 6 by an electric motor 7 which is disposed vertically in the machine bed 2 and drives the belt drive through a gearbox 8. As can be seen from FIGURE 2, the belt drive 6 is disposed in the region of the division plane between the machine bed 2 and the base plate 1, where it is readily accessible after lifting off the bed 2. In order to permit replacement of the belt without lifting off the machine bed 2, the trough shown in FIGURE 2 in the base plate is advantageously made sufficiently deep so that the belt after slackening can be dropped downwards and drawn out through an opening in the rear of the base plate.

Figure 1:
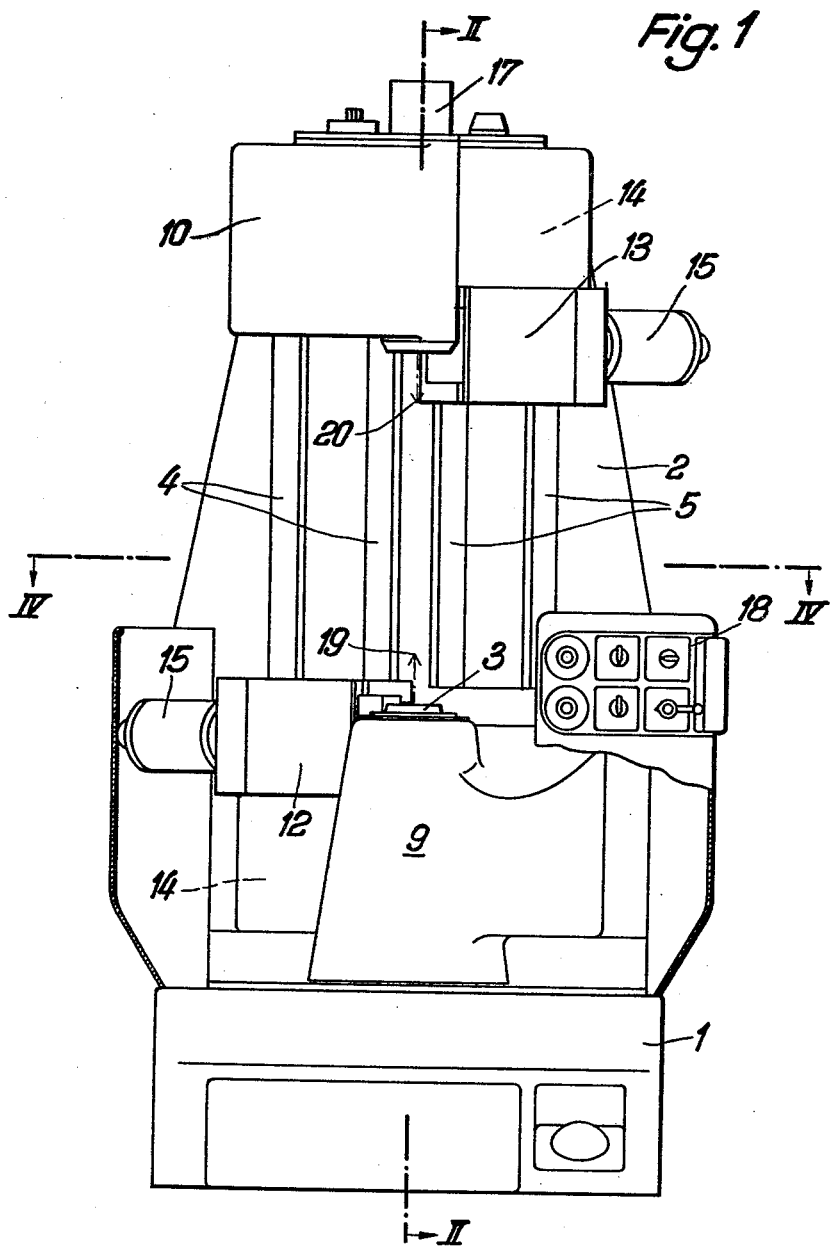
FIGURE 1 shows the vertical turning mill in a front elevation.

A headstock 9 carrying the main spindle 3 is mounted on a special guide track 5' (see FIGURE 4) adjoining the right hand guide track 5 (in FIGURE 1), and a tailstock 10 serving for the counter-supporting of the workpiece (not shown) is mounted on the left hand guide track 4. The two guide tracks 4, 5 are so long that the tool rests 12, 13 at these ends can be pushed out with their tools 11 beyond the respective end of the longest workpiece which can be machined in the machine.

The tool rests 12, 13 illustrated are constructed as normal copying rests and are provided with hydraulic feed devices 14, 15, which correspond to constructions know per se and therefore are not more fully described here. The headstock 9 and the tailstock 10 can also be clamped against the workpiece by known hydraulic clamping devices 16, 17. All the hydraulic devices mentioned can moreover be electrically controlled from a control station 18.

Through the above described arrangement of the main drive unit behind the guide tracks, a very large chip space 19 is obtained despite the relatively narrow construction of the turning mill resulting from the inclined positions of the guide tracks, while the above described inclination of the guide tracks also leads to a favourable flow of force for the machining pressures to be transmitted from the machining point to the vertical base plate.

We claim:
1. A vertical turning mill comprising a base, a hollow bed projecting vertically upwards from the rear portion of said base, a plurality of sets of vertical guideways on said bed, a headstock mounted on one set of guideways above said base and forwardly of said bed, a vertical spindle rotatably mounted in said headstock, a pulley on the lower end of said spindle, a vertically arranged drive motor and gear box disposed in said hollow bed rear- wardly of and in alignment with the portion of said bed containing said guideways, a pulley at the lower end of said gear box, a belt connecting said pulleys to drive said spindle, the other sets of said guideways being disposed in planes extending outwardly and rearwardly at an angle of the order of 30 degrees with respect to a plane passing rearwardly through the axis of rotation of said spindle and tool holders slidably mounted on said other sets of guideways.

2. A vertical turning mill as defined in claim 1, in which a retaining wall having a height greater than the height of said headstock is secured to said base and said bed in spaced surrounding relationship to said headstock to provide a relatively deep chip receiving space.

References Cited in the file of this patent

UNITED STATES PATENTS

| | | |
|---|---|---|
| 683,592 | Bullard | Oct. 1, 1901 |
| 2,118,020 | Curtis | May 17, 1938 |
| 2,365,068 | Gerbig | Dec. 12, 1944 |